Figure 5:
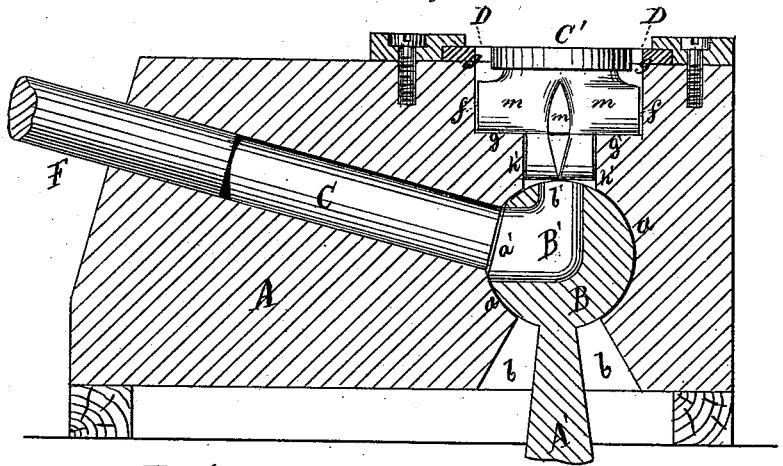

J. McCLOSKEY.
Manufacture of Plumbers' Traps.
No. 228,369.
Patented June 1, 1880.
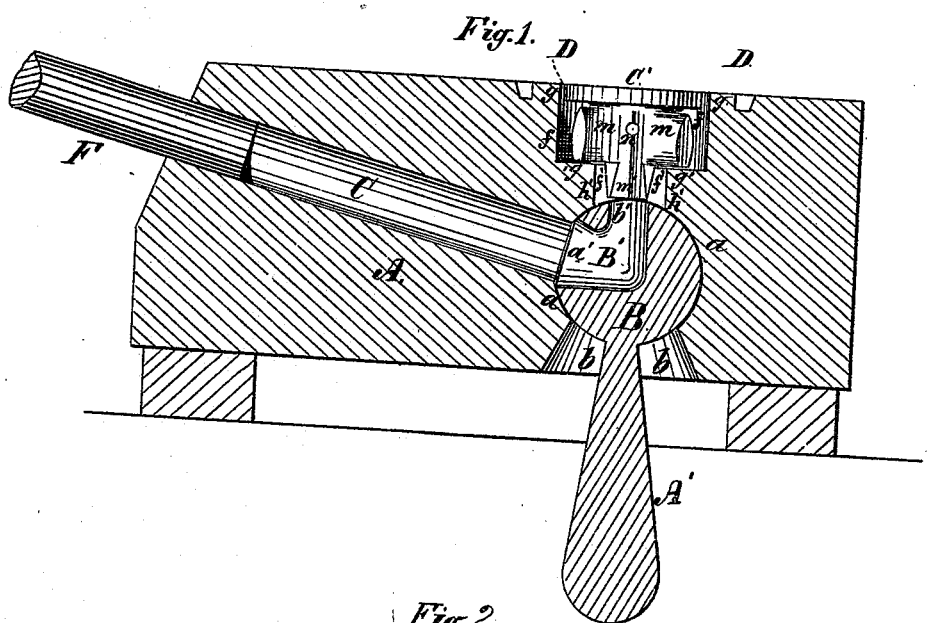
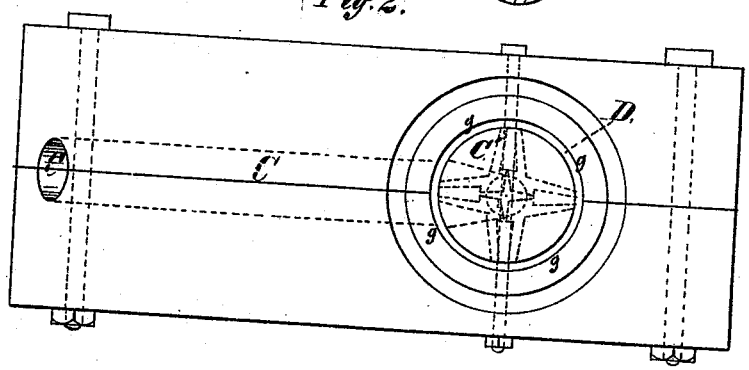
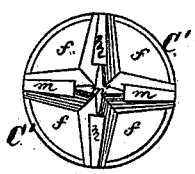
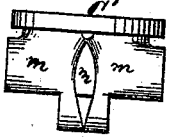
Witnesses:
W. M. Haviland
T. P. Hopkins
Inventor:
John McCloskey 2 Sheets—Sheet 2.

J. McCLOSKEY.
Manufacture of Plumbers' Traps.

No. 228,369. Patented June 1, 1880.

Witnesses:
H. M. Haviland
T. P. Hopkins

Inventor:
John McCloskey

UNITED STATES PATENT OFFICE.

JOHN McCLOSKEY, OF NEW YORK, N. Y.

MANUFACTURE OF PLUMBERS' TRAPS.

SPECIFICATION forming part of Letters Patent No. 228,369, dated June 1, 1880.

Application filed November 7, 1879.

*To all whom it may concern:*

Be it known that I, JOHN MCCLOSKEY, of the city, county, and State of New York, have invented certain Improvements in Apparatus for Making Plumbers' Traps, &c., of which the following is a specification.

This invention relates to that class of apparatus for making curved pipes or plumbers' traps by forcing lead or other suitable material through an annular die, or a die of oval or other suitable form, with variable velocities at different portions or sides of the die, the material, as it is ejected from the die, curving in a direction away from the side at which the material moves with the greatest velocity.

One object of my present invention is to provide for the production of the die-drawn plumbers' traps having an increased thickness of metal at their bottoms or lower parts, in order to increase their strength and durability; also, to enable the pipe and the trap to be curved in any direction, and also to provide an apparatus more simple and easily operated than any hitherto devised; and to this end the invention consists in a certain novel method of forming the traps with increased thickness of metal at their lower portions, and further comprises the combination of a valve or cut-off constructed to have a universal movement with reference to the die through which the material is ejected in the formation of the pipe or trap, whereby the preponderance of speed in the ejectment of the material through the die may be instantaneously shifted to any part of the said die, thereby enabling any desired bend, curve, or coil to be given to the pipe or trap formed by the ejectment of the material from the die.

The invention further comprises a novel combination of radial partitions with the valve, capable of a universal movement, and the die, whereby the material, the flow of which is governed by the valve aforesaid, may be caused to pass in greater or less quantity, as may be desired, to any determinate portion of the die, in order that the pipe or trap ejected therefrom may be curved in predeterminate or determinate directions—as, for example, with bends or curves at right angles to each other.

The invention further comprises a novel combination of an operating-handle attached to the valve, capable of a universal movement, a globular valve-seat constructed with a conical opening, and a die, whereby is secured the easy and convenient manipulation of the valve to govern or control the flow of the material through and from the die, as hereinbefore explained.

The invention also comprises the combination, with the die and the valve, capable of a universal movement, of a receiver for holding the material and supplying the same to the said valve, to and through the die, in the production of the curved pipe, traps, &c.; and it further comprises certain novel combinations of parts, herein fully set forth.

Figure 6:
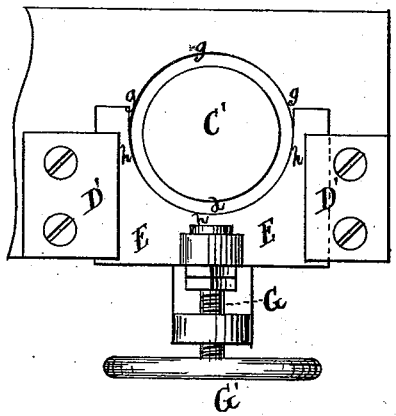
Figure 7:
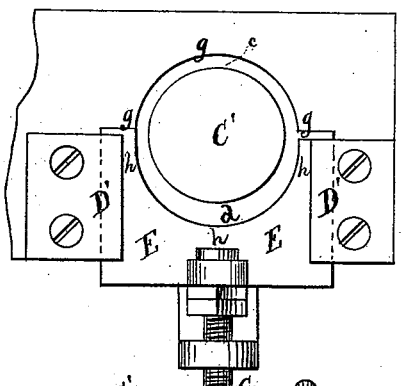
Figure 8:
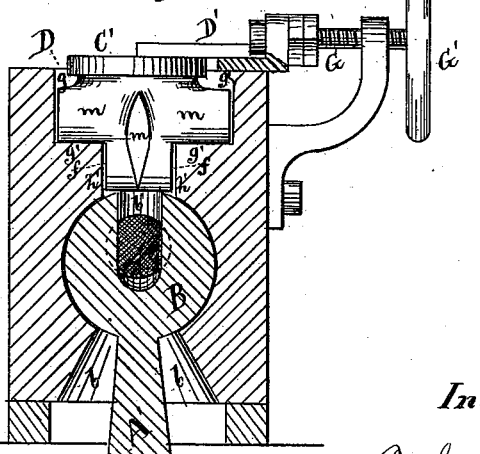

Referring to the accompanying drawings, Figure 1 is a central vertical sectional view of an apparatus made according to my invention in one form, Fig. 2 being a plan view of the same, and Figs. 3 and 4 detached detail views of one portion thereof. Fig. 5 is a central vertical sectional view of the apparatus, embodying another form of my invention, Figs. 6 and 7 being plan views of the same, showing certain parts in different positions, and Fig. 8 is a transverse sectional view of the same.

C is the receiver, which receives the lead or other material from which the pipes or traps are to be made, and is provided in the body or frame A of the machine, in which is also provided the globular or spherical valve-seat $a$, constructed with a conical opening, $b$.

B is the valve, externally of spherical form, and fitted in the spherical valve-seat $a$, said valve being provided with a handle, A', extending through the opening $b$, and which, being grasped by the hand of the operator, or worked by hydraulic power or other suitable means, enables the valve B to be moved in any direction.

B' is the bore or passage of the valve B, one end, $a'$, of said bore communicating with the receiver C, and the other end, $b'$, of the bore with the chamber $f$, leading to the die D, which is represented as annular, or approximately so, as the case may be, of which die C' is the core. The core is of circular form; but the surrounding or outer wall, $g$, of the die (while represented in a modified form—*i. e.*, also of circular form in Figs. 1 and 2, where such wall is at a distance from the circumference of the core C' equal to the thickness of the walls of the pipe or trap to be made) is longer in one direction than the other, as shown in Figs. 7 and 8, or is what may be termed "approximately oval." In the figures last named it will be seen that the core C' is placed with its circumference concentric with one-half of the wall $g$, as shown at $c$ in Fig. 7, and eccentric to the opposite half, as shown at $d$ in the same figure.

Formed preferably in one piece with the core C' are downwardly-extending radial partitions $m$, which rest upon shoulders $g'$, formed midway between the top and bottom of the chamber $f$, said partitions extending to the wall $h'$, but, just below the core proper, being shortened within the circumference of the core proper, and preferably tapered outward, the portions extending beyond the circumference of the core being likewise preferably tapered upward to the mouth of the die, to facilitate the flowing together or uniting of the material when it reaches the die. The lower part of the chamber $f$ is narrowed, as shown at $h'$, and in like manner the lower portions of the partitions $m$ are narrowed to fit into the diminished lower portion, $f'$, of the said chamber. The core C' may be held down in its place by a transverse bolt, $n$, passed through it and through the frame A, or by any other suitable means.

F is the plunger, worked by hydraulic power or other suitable means, for forcing the material in the receiver C.

E is a slide arranged to slide upon the upper part of one side of the body or casting A, in which the parts hereinbefore set forth are provided and arranged, the said slide working, for example, in fixed guides D'. The front of this slide E is recessed on the arc of a circle, as shown at $h$, of the same radius as the part $g$ of the outermost wall of the die D, so that by pushing inward or forward this slide E to the requisite degree the semicircular edge $h$ of the recess $d$, in conjunction with the part $g$ of the wall, will form a true circle concentric with the core C'.

The backward and forward movements are given to the slide E by means of the screw G and its hand-wheel G', or by hydraulic power or any other suitable means.

The core C' is made to rise or extend sufficiently above the wall $g$ to form, with the slide E, when used, the mouth of that side of the die when a thickness other than that indicated by the distance from the core to the wall $g$ is required to be given to that side of the pipe or trap.

The lead, at a suitable temperature, or other plastic material to be used, being placed in the receiver C, and the plunger F being started forward, the material is forced, in a more or less fluid, plastic, or softened condition, as the case may be, into and through the bore B' of the valve B. If, during the flow or passage of the lead or other material to the die D, the valve B is operated to conduct a larger portion or quantity of such material to one side of the die D than to another, the material will issue from the die in greater volume and with greater rapidity at such side than at the other, thereby curving or bending the material as it issues in tubular form from the die.

Inasmuch as the spaces between the partitions $m$ constitute separate passages from the bore B' to the die D, it follows that by operating the valve B to throw a preponderance of the material into any one or two of said passages, the pipe or trap may be turned in any one of several different directions, proportioned in number with the number of the said passages, or, in other words, to the number of the partitions $m$. For example, when, as represented in the drawings, these partitions are employed, the material, as it issues in tubular form from the die, may be bent or curved in different directions—as, for instance, in forming traps with their connections and planes at right angles—whereas if no such partitions were used, and the preponderance of material at one side or another of the die D depended simply upon the relative position of the end $b'$ to the bore B' with reference to the different portions of the die D, it would be more difficult to give an accurate or predetermined form to the curved pipe or trap resulting from the operation of the apparatus, and would be difficult, if not impossible, to give as short curves or bends to the pipe or trap as can be produced by the use of partitions.

In describing, as hereinbefore, the operation of the apparatus, it is to be understood that if the slide E is used it is adjusted so that the die D, of which it then constitutes a part, forms a concentric circle, so that the mouth of the die is of the same width at all portions, when, by causing the same quantity of material to be forced into each passage from the valve B, the pipe will issue from the die D in a straight tubular form, its walls being of equal thickness on all sides, or of uniform thickness throughout; but if the slide E be moved outward, so as to increase the width of the space between the core C' and the edge $h$, the thickness of the adjacent portion of the pipe issuing therefrom will be increased until at last the limit of this thickness will be reached and the slide withdrawn entirely away from the adjacent part of the outermost wall $g$, which then supersedes the slide in forming the mouth of the die.

Of course, in increasing the thickness to any extent, as just described, a greater preponderance of material will require to be directed to such side of the die to form the outer curve of the bend than if uniform thickness were required.

By these means any desired thickness may be given to one longitudinal half or to any portion of such half of the pipe or trap during its formation, and this thickness may be increased or diminished simultaneously with the moving of the valve B, so that by providing for the increased thickness of the pipe at the same time with the curvature of it in a direction away from the slide E a plumbers' trap may be formed with the thickness of its bottom or lower portion materially greater than other portions of it, and without in any wise altering the circular form or diameter of the bore of the pipe produced or the thickness of other portions of the said pipe.

Machines have heretofore been constructed with dies for forming the emerging plastic material into pipes, devices for forming curves in the pipe by increasing or diminishing the velocity of efflux on different sides of the pipe-former, and means for shifting the resistance from side to side without stopping the machine, and I do not claim these devices or any of them, broadly; but

I claim as my invention—

1. The herein-described method of making die-drawn traps with thickened bottoms, without reducing the thickness elsewhere, by forcing the material through a die the variable width of one side of which is changed simultaneously with the passage of the material through the die, substantially as herein set forth.

2. The combination of the recessed slide E, or its equivalent, with the die D, constructed with its core C' eccentric to a portion of the walls of the die, substantially as and for the purpose herein set forth.

3. The valve constructed to have a universal movement, in combination with a die for the production of curved pipes or traps, substantially as and for the purpose herein set forth.

4. The combination of partitions $m$ with the valve constructed to have a universal movement and the die D, all substantially as and for the purpose herein set forth.

5. The valve-seat $a$, constructed with a conical opening, $b$, in combination with handle A' of the valve B and die D, all substantially as and for the purpose herein set forth.

6. The combination of the receiver C, the valve B, capable of a universal movement, and the die D, all substantially as and for the purpose herein set forth.

JOHN McCLOSKEY.

Witnesses:
H. M. HAVILAND,
T. P. HOPKIN.